United States Patent
Marupaduga et al.

(10) Patent No.: US 11,638,199 B1
(45) Date of Patent: *Apr. 25, 2023

(54) DYNAMIC CONTROL OF CONNECTIONS WITH DUAL-CONNECTIVITY-CAPABLE DEVICES

(71) Applicant: Sprint Spectrum L.P., Overland Park, KS (US)

(72) Inventors: Sreekar Marupaduga, Overland Park, KS (US); Anurag Thantharate, Overland Park, KS (US); Rajveen Narendran, Olathe, KS (US)

(73) Assignee: Sprint Spectrum LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/454,505

(22) Filed: Nov. 11, 2021

Related U.S. Application Data

(63) Continuation of application No. 16/799,014, filed on Feb. 24, 2020, now Pat. No. 11,206,604.

(51) Int. Cl.
  *H04W 24/10* (2009.01)
  *H04W 48/06* (2009.01)
  *H04W 76/15* (2018.01)
  *H04W 8/24* (2009.01)

(52) U.S. Cl.
  CPC ............ *H04W 48/06* (2013.01); *H04W 8/24* (2013.01); *H04W 24/10* (2013.01); *H04W 76/15* (2018.02)

(58) Field of Classification Search
  CPC ....... H04W 48/06; H04W 8/24; H04W 24/10; H04W 76/15
  See application file for complete search history.

(56) References Cited

U.S. PATENT DOCUMENTS

| | | | |
|---|---|---|---|
| 2019/0174421 A1 | 6/2019 | Quan et al. | |
| 2020/0205062 A1 | 6/2020 | Azizi et al. | |
| 2020/0389823 A1* | 12/2020 | Xu | H04W 76/20 |
| 2021/0266801 A1* | 8/2021 | Shah | H04W 76/16 |

OTHER PUBLICATIONS

U.S. Appl. No. 16/560,150, filed Sep. 4, 2019.

* cited by examiner

*Primary Examiner* — Chuong A Ngo
(74) *Attorney, Agent, or Firm* — McDonnell Boehnen Hulbert & Berghoff LLP

(57) ABSTRACT

A mechanism for controlling operation of a first access node that supports operation according to a first radio access technology (RAT) but does not support dual-connectivity operation according to the first RAT and a second RAT. A system detects a high extent of occurrences of dual-connectivity-capable user equipment devices (UEs) being connected with the first access node when the dual-connectivity-capable UEs could instead connect with a second access node that supports the dual-connectivity operation. And in response, the first access node blocks dual-connectivity-capable UEs from being connected with the first access node while allowing UEs that are not dual-connectivity capable to be connected with the first access node.

20 Claims, 5 Drawing Sheets

DYNAMIC CONTROL OF CONNECTIONS WITH DUAL-CONNECTIVITY-CAPABLE DEVICES

REFERENCE TO RELATED APPLICATION

This is a continuation of U.S. patent application Ser. No. 16/799,014, filed Feb. 24, 2020, the entirety of which is hereby incorporated by reference.

BACKGROUND

A cellular wireless network typically includes a number of cell sites including access nodes that are configured to provide wireless coverage areas in which user equipment devices (UEs) such as cell phones, tablet computers, machine-type-communication devices, tracking devices, embedded wireless modules, and/or other wirelessly equipped communication devices (whether or not user operated) can operate. Further, each access node could be coupled with a core network that provides connectivity with various application servers and/or transport networks, such as the public switched telephone network (PSTN) and/or the Internet for instance. With this arrangement, a UE within coverage of the cellular network could engage in air interface communication with an access node and could thereby communicate via the access node with various application servers and other entities.

Such a network could operate in accordance with a particular radio access technology (RAT), with communications from the access nodes to UEs defining a downlink or forward link and communications from the UEs to the access nodes defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each coverage area could operate on one or more carriers, each of which could be frequency division duplex (FDD), defining separate frequency channels for downlink and uplink communication, or time division duplex (TDD), with a single frequency channel multiplexed over time between downlink and uplink use. Further, on the downlink and uplink, each carrier could be structured to define various physical channels including time-frequency resources for carrying information between the access node and UEs. For example, the air interface could be divided over time into frames, each divided in turn into subframes and timeslots, and the carrier bandwidth (frequency width of the carrier on the downlink and/or uplink) could be divided over frequency into subcarriers, which could be grouped within each timeslot to define physical resource blocks (PRBs) in which the subcarriers can be modulated to carry data.

OVERVIEW

When a UE enters into coverage of an example network, the UE could detect threshold strong coverage of an access node (e.g., a threshold strong reference signal broadcast by the access node) and could then engage in random-access and Radio Resource Control (RRC) signaling to establish an RRC connection through which the access node will then serve the UE. Further, if the UE is not already registered for service with the core network, the UE could transmit to the access node an attach request, which the access node could forward to a core-network controller for processing. And the core-network controller could then coordinate setup for the UE of one or more user-plane bearers extending between the UE and a core-network gateway that provides transport-network connectivity.

Once the UE is so connected and registered, the access node could then serve the UE in a connected mode, managing downlink air-interface communication of packet data to the UE and uplink air-interface communication of packet data from the UE.

For example, when packet data for the UE arrives at the core network from a transport network, the data could flow to the UE's serving access node, and the access node could then schedule and provide transmission of that data to the UE on particular downlink PRBs. Likewise, when the UE has data to transmit on the transport network, the UE could transmit a scheduling request to the access node, the access node could responsively schedule transmission of that data from the UE on particular uplink PRBs, and the UE could accordingly transmit the data to the access node for forwarding through the core network to the transport network.

Further, when a UE is served by an access node, the UE could monitor coverage strength of the access node and of neighboring access nodes. And if and when the UE determines that certain defined coverage strength thresholds are met (such as neighboring coverage being threshold stronger than serving coverage), the UE could signal to its serving access node, and the serving access node could then coordinate handover of the UE to the neighboring access node.

As the industry advances from one generation of RAT to the next, networks and UEs may also be configured to support service on multiple RATs at once. With the transition from 4G LTE to 5G NR, for instance, a wireless operator that provides cell sites with 4G access nodes (evolved Node-Bs (eNBs)) could upgrade those cell sites to include 5G access nodes (next generation Node-Bs (gNBs)) as well and to support an arrangement referred to as EUTRA-NR Dual Connectivity (EN-DC) in which UEs could be served concurrently over a 4G connection and a 5G connection. Further, new UEs could likewise be configured with both 4G radios and 5G radios and with logic to support EN-DC operation provided by such cell sites. This arrangement could help support transition from 4G technology to 5G technology and could also facilitate higher peak data rate of communication by allowing data to be multiplexed over 4G and 5G connections, among possibly other benefits.

When a UE that supports EN-DC service enters into such a cell site, the UE could initially scan for and detect coverage of the cell site's 4G eNB and engage in random-access and RRC signaling to establish a 4G connection between the UE and the 4G eNB as discussed above. In turn, perhaps having determined from profile data that the UE is EN-DC capable, the 4G eNB could then work with the core network and the 5G gNB to establish a 5G connection between the UE and the 5G gNB and to establish bearer connectivity for the UE between the 5G gNB and the core network. With these 4G and 5G connections so established, the 4G and 5G access nodes could then serve the UE with packet-data communications concurrently on their respective connections with the UE, with a portion of data flowing over the UE's 4G connection with the 4G eNB concurrently with another portion of the data flowing over the UE's 5G connection with the 5G eNB.

More generally, dual-connectivity service (or non-standalone service) of a UE may involve the UE having co-existing connections according to multiple different RATs and being served with communication concurrently on those multiple different-RAT connections, which might provide the UE with increased peak data rate. This is to be distinguished from single-connectivity service (or standalone service) of a UE, where the UE is served with communication according to just a single RAT, such as with just a 4G connection or just a 5G connection for instance.

In some dual-connectivity arrangements, an access node operating under a first RAT (i.e., a first-RAT access node) could serve as a master node (MN), responsible for RRC signaling with the UE, responsible for coordinating setup and teardown of dual-connectivity service for the UE, and functioning as an anchor point for core-network control signaling related to the dual-connected UE. And an access node operating under a second RAT (i.e., a second-RAT access node) could serve as a secondary node (SN), to provide increased data capacity for the UE for instance. With EN-DC, for example, a 4G eNB could operate as the MN (referred to as an MeNB), and a 5G gNB could operate as the SN (referred to as an SgNB).

As a wireless operator upgrades its network from providing service according to a first RAT to additionally providing service according to a second RAT and providing dual-connectivity service on the two RATs, the operator may do so progressively from cell site to cell site. As a result, at least during that transition but also possibly later, some of the network's first-RAT access nodes may support both providing first-RAT-only service and providing dual-connectivity service (dual-connectivity-capable first-RAT access nodes), while other of the network's first-RAT access nodes may support providing just first-RAT-only service and not dual-connectivity service (first-RAT-only access nodes).

Further, the development of UEs that are configured to support dual-connectivity service may also be progressive. Thus, for at least some time, some UEs may support engaging in first-RAT service and engaging in dual-connectivity service (dual-connectivity-capable UEs), while other UEs may support engaging in first-RAT service but not engaging in dual-connectivity service (first-RAT-only UEs).

For instance, when an operator upgrades its network to add 5G gNBs and to configure 4G eNBs to support EN-DC service through interworking with the 5G gNBs, some of the network's 4G eNBs may support providing 4G service and also providing EN-DC service (EN-DC-capable 4G eNBs), while other of the network's 4G eNBs may support providing just 4G service but may not support providing EN-DC service (4G-only eNBs). Likewise, some UEs that subscribe to the operator's service may support engaging in 4G service and engaging in EN-DC service (EN-DC-capable UEs), while other UEs that subscribe to the operator's service may support engaging in 4G service but may not support engaging in EN-DC service (4G-only UEs).

In this or similar situations, one technological problem that can arise is that, if a first-RAT-only access node and a dual-connectivity-capable first-RAT access node provide overlapping coverage, at least some dual-connectivity-capable UEs that are within the coverage-overlap area may end up connecting with the first-RAT-only access node rather than with the dual-connectivity-capable first-RAT access node and may therefore not benefit from receiving dual-connectivity service. This could happen during initial connection or through handover, for instance if the UEs detect sufficiently stronger coverage from the first-RAT-only access node than from the dual-connectivity-capable first-RAT access node.

For instance, if an EN-DC-capable 4G eNB and a 4G-only eNB provide overlapping coverage, at least some EN-DC-capable UEs that are within the coverage-overlap area may receive sufficiently stronger coverage from the 4G-only eNB than from the EN-DC-capable 4G eNB and may therefore end up connecting with the 4G-only eNB rather than with the EN-DC-capable UE. As a result, those EN-DC capable UEs may not benefit from EN-DC service that they could otherwise be receiving. Further, having the 4G-only eNB serve those EN-DC-capable UEs could consume limited resources (e.g., PRBs or processing resources) of the 4G-only eNB, which could limit the service that the 4G-only eNB could provide to 4G-only UEs.

The present disclosure provides a mechanism to help address this problem. In accordance with the disclosure, a system will keep track of occurrences of dual-connectivity-capable UEs being connected with the first-RAT-only access node when the dual-connectivity-capable UEs are also within sufficiently strong coverage of the dual-connectivity-capable first-RAT access node. Based on this tracking, the system will then detect a predefined threshold high extent of such occurrences. And in response, the system will block dual-connectivity-capable UEs (i.e., one or more UEs of that class) from being connected with the first-RAT-only access node while allowing first-RAT-only UEs to be connected with the first-RAT-only access node.

Taking this action could help to increase the likelihood that dual-connectivity-capable UEs will instead connect with (or hand over to) the dual-connectivity-capable first-RAT access node, so that those UEs can benefit from dual-connectivity service, and may also help to free up resources of the first-RAT-only access node to serve first-RAT-only UEs.

In an example implementation, the system could determine or predict that such occurrences tend to occur at a particular time of day and, in response, could cause the first-RAT-only access node to block dual-connectivity-capable UEs from being connected with the first-RAT access node at or approaching that time of day. Alternatively, the system could do this without limitation to a particular time of day or the like.

With 4G and EN-DC, for instance, such a system could keep track of occurrences of EN-DC-capable UEs being connected with a 4G-only eNB when those UEs are also within sufficiently strong coverage of one or more EN-DC-capable 4G eNBs. Based on this tracking, the system could then detect at least a predefined threshold high extent of such occurrences, possibly at a particular time of day. And in response, the system could then block EN-DC-capable UEs from being connected with the 4G-only eNB while allowing 4G-only UEs to be connected with the 4G-only eNB, possibly at or approaching the particular time of day, so as to help increase the likelihood that EN-DC-capable UEs will instead connect with (or hand over to) an EN-DC-capable 4G eNB.

Blocking dual-connectivity-capable UEs from being connected with the first-RAT-only access node while allowing first-RAT-only UEs to be connected with the first-RAT-only access node could be carried out by the first-RAT-only access node and/or an associated control entity.

By way of example, if the first-RAT-only access node normally operates in a mode in which the first-RAT-only access node allows UEs to be connected with the first-RAT-only access node regardless of whether the UEs are dual-connectivity capable, the first-RAT-only access node could switch to operate in a mode in which, based on a UE being dual-connectivity capable, the first-RAT-only access node would block the UE from being connected with the first-RAT-only access node. Further, the first-RAT-only access node could carry out the blocking in various ways, examples of which include (i) declining new connection requests from the dual-connectivity-capable UE, (ii) declining hand-in of the dual-connectivity-capable UE, and (ii) releasing and redirecting the dual-connectivity-UE to perhaps connect instead with a dual-connectivity-capable access node that provides the overlapping coverage.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

Figure 1:
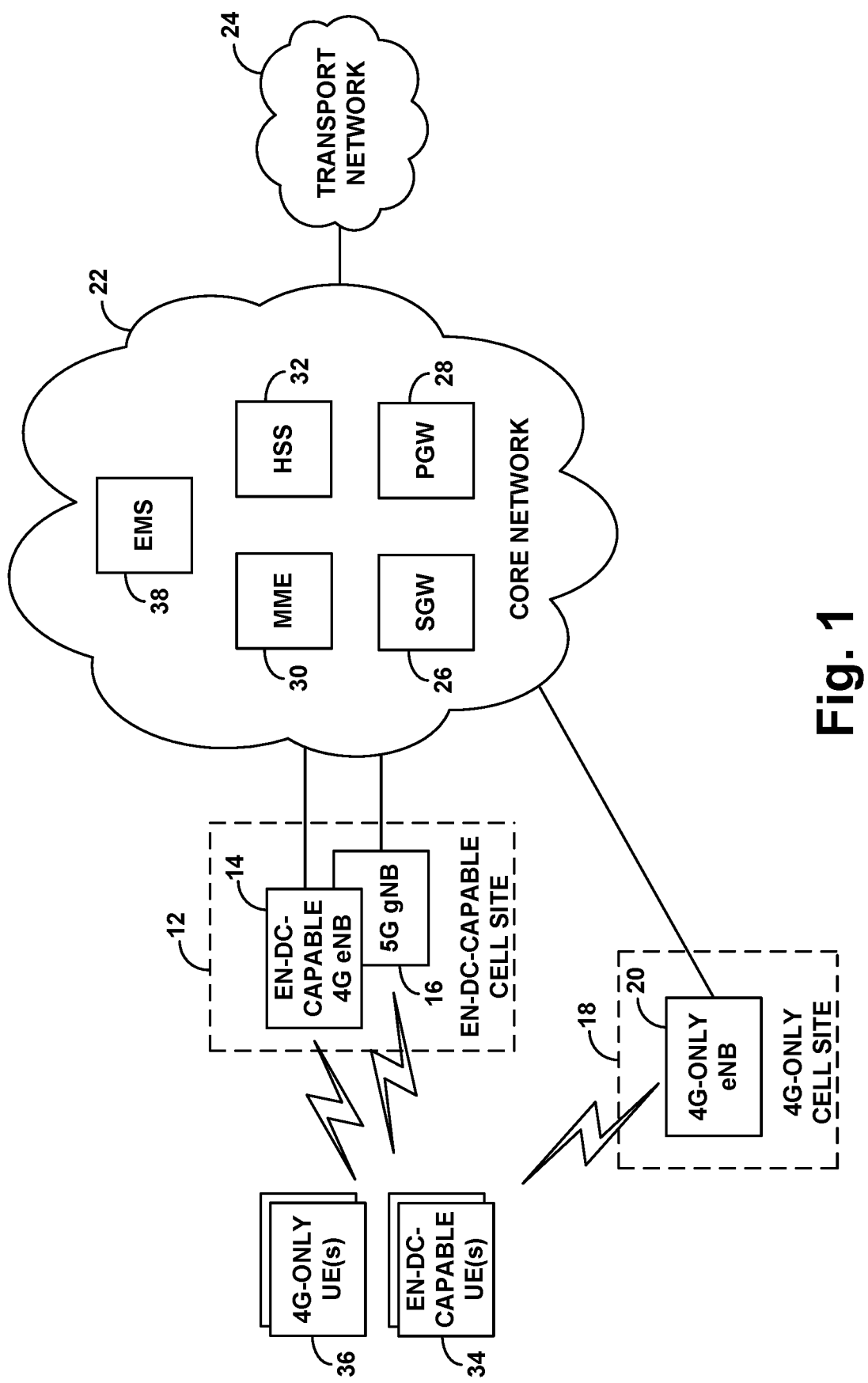
FIG. 1 is a simplified block diagram of an example wireless communication system in which various disclosed features can be implemented.

An example implementation will now be described in the context of 4G LTE, 5G NR, and EN-DC. It should be understood, however, that the principles disclosed herein could extend to apply with respect to other scenarios as well, such as with respect to other RATs and other dual-connectivity configurations. Further, it should be understood that other variations from the specific arrangements and processes described are possible. For instance, various described entities, connections, functions, and other elements could be added, omitted, distributed, re-located, re-ordered, combined, or changed in other ways.

As noted above, FIG. 1 is a simplified block diagram of an example wireless communication system in which various disclosed features can be implemented. In particular, the figure depicts a representative arrangement including an EN-DC-capable cell site 12 having an EN-DC-capable 4G eNB 14 and a 5G gNB 16, and a 4G-ony cell site 18 having a 4G-only base station 20 and not having a 5G gNB. (Note that these example cell sites might also support one or more other RATs aside from these, such as one or more legacy RATs for instance. But the focus of the example discussion here will be just 4G and 5G.)

Each of these cell sites could be at a respective location within a region, and the two example cell sites could be adjacent to each other (or one encompassing the other) such that a UE could be in overlapping coverage of the two cell sites and might be able to hand over from one cell site to the other.

In addition, each access node could also take various forms. For instance, an access node could be a macro access node of the type that would typically include a tower mounted antenna structure for providing a broad range of coverage. Or an access node could be a small-cell access node, femtocell access node, relay access node, or other type of access node that might have a smaller form factor with an antenna structure that provides a narrower range of coverage. Further, at cell site 12, the 4G eNB 14 and 5G gNB 16 might share an antenna tower and/or other such structures or equipment. Other arrangements are possible as well.

Access nodes 14, 16, and 20 are each shown coupled with an example core network 22. Core network 22 could be an evolved packet core (EPC) network, a next generation core (NGC) network, or another network that includes components that may support an applicable RAT and provide connectivity with at least one transport network 24, such as the Internet for instance. Further, in an alternative embodiment, access nodes may be coupled with different core networks than each other.

In an example implementation as shown, the core network 22 includes a serving gateway (SGW) 26, a packet data network gateway (PGW) 28, a mobility management entity (MME) 30, and a home subscriber server (HSS) 32. Each access node could have an interface with the SGW, the SGW could have an interface with the PGW, and the PGW could provide connectivity with the transport network. With this arrangement, the SGW and PGW could cooperatively provide user-plane connectivity between each access node and the transport network, to enable a UE served by an access node to engage in communication on the transport network, and the MME could operate as a core-network controller, to carry out operations such as coordinating UE attachment and setup of user-plane bearers. Further, the HSS 30 could store UE profile records, which could specify service-subscription plans, UE configurations, and/or UE capability information, such as whether a UE is EN-DC capable for instance.

As noted above, the air interface between each access node and UEs within its coverage could be structured to define various air-interface resources.

By way of example, in the time domain, the air interface could define a continuum of 10-millisecond (ms) frames, each divided into ten 1-ms subframes, and each subframe could be further divided into a number of timeslots, each additionally divided into symbol time segments. And in the frequency domain, the bandwidth of each carrier on which the access node operates could be divided into subcarriers with specified subcarrier spacing on the order of 15 to 240 kHz. With this arrangement, the air interface on each carrier could define an array of resource elements each occupying a subcarrier and spanning a symbol time segment, and the access node and UEs could communicate with each other through modulation of the subcarriers to carry data in those resource elements. Variations of this arrangement are possible as well.

Further, particular sets of resource elements on the air interface could be grouped together to define the PRBs discussed above. In an example implementation, each PRB could span one timeslot in the time domain and a group of subcarriers in the frequency domain. Depending on the carrier bandwidth, the air interface could thus support a certain number of such PRBs across the bandwidth of the carrier within each timeslot.

In addition, certain resource elements on the downlink and uplink could be reserved for particular control-channel or shared-channel communications.

For instance, on the downlink, certain resource elements per subframe (or per downlink subframe in TDD) could be generally reserved to define a downlink control region for carrying control signaling such as scheduling directives and acknowledgements from the access node to UEs. And other resource elements per subframe could be generally reserved to define a shared channel in which PRBs could carry scheduled data communications from the access node to UEs. Further, certain resource elements in particular downlink subframes could be reserved to carry synchronization signals that UEs could detect as an indication of the presence of coverage and to establish timing synchronization, and other resource elements per downlink subframe could be reserved to carry a reference signal that UEs could measure as a basis to determine coverage strength and to provide channel estimates to facilitate precoding, beamforming, or the like.

On the uplink, on the other hand, certain resource elements per subframe (or per uplink subframe in TDD) could be reserved to define an uplink control region for carrying control signaling such as random-access requests, channel-quality reports, scheduling requests, and acknowledgements, from UEs to the access node. And other resource elements per subframe could be reserved to define a shared channel in which PRBs could carry scheduled data communications from UEs to the access node. Further, still other resources on the uplink could be reserved for other purposes as well, such as for carrying uplink reference signals or the like.

Note also that the 4G air interface and 4G service provided respectively by each 4G eNB 14, 20 could differ from the 5G air interface and 5G service provided by the 5G gNB 16 in various ways now known or later developed. For example, one may provide variable subcarrier spacing, but the other may provide fixed subcarrier spacing. As another example, one may have different symbol time segments than the other. As still another example, one may make use of different MIMO technologies than the other. And as yet another example, with TDD carriers, one may have a flexible TDD configuration and the other may have a fixed TDD configuration. Other examples are possible as well.

FIG. 1 further illustrates example UEs 34, 36 located within coverage of cell site 12 and possibly also within coverage of cell site 14. Each of these UEs could take any of the forms noted above, among other possibilities, and the UEs could differ in form from each other.

UEs 34 are shown being EN-DC-capable UEs. As such, each UE 34 could include a 4G radio for connecting with and being served by a 4G eNB, and a 5G radio for connecting with and being served by a 5G gNB. Further, each UE 34 could have logic and perhaps an associated service-subscription, enabling the UE to engage in EN-DC service when available. Whereas UEs 36 are shown being 4G-only UEs. As such, each UE 36 would include a 4G radio for connecting with and being served by a 4G eNB but may not include a 5G radio or may not include logic or service-subscription support for engaging in EN-DC service.

Any such 4G-capable UE could initially scan for the presence of 4G coverage by searching for a broadcast synchronization signal on each of one or more 4G carriers for instance. Upon finding 4G coverage from a 4G eNB, the UE could then determine coverage strength from the 4G eNB, such as by evaluating reference signal receive strength (RSRP) or reference signal receive quality (RSRQ), among other possibilities. And the UE could determine if the coverage strength is sufficient to support a connection, such as if the coverage strength is at least as high as a predefined threshold level deemed sufficiently strong to support a connection.

Upon determining that the coverage from the 4G eNB is sufficiently strong, the UE could then engage in random-access signaling and RRC-configuration signaling with the 4G eNB to connect with the 4G eNB as noted above, thus putting the UE in an RRC-connected mode. In particular, the UE could transmit to the 4G eNB on an uplink physical random access channel (PRACH) a random-access preamble, and the 4G eNB could respond by assigning a temporary connection identifier to the UE and allocating uplink PRB resources for RRC signaling. The UE could then use the allocated uplink resources to transmit to the 4G eNB an RRC connection request together with UE-identification information, and the 4G eNB could grant the RRC connection request, thus establishing an RRC connection between the 4G eNB and the UE.

In this process, the 4G eNB could require, as a condition precedent for allowing the UE to connect with the 4G eNB, that the UE be in threshold-close signaling distance to the 4G eNB. The 4G eNB could check for this condition by determining a signal delay of the random-access preamble that the UE transmits to the 4G eNB (e.g., by comparing time of arrival of the random-access preamble at the 4G eNB to a predefined random-access transmission-time at which the UE would have transmitted the random-access preamble), and determining if the signal delay is no higher than a predefined maximum signal delay. If the 4G eNB determines that the signal delay is no higher than the predefined maximum signal delay, then the 4G eNB could allow the UE to connect with the 4G eNB. Whereas, if the 4G eNB determines that the signal delay is higher than the predefined maximum signal delay, then the 4G eNB could block the UE from connecting, such as by disregarding the UE's random-access preamble transmission.

In any event, with at least an initial RRC connection established, the UE could then transmit to the 4G eNB an attach request message if appropriate, which the 4G eNB could forward to the MME 30 for processing. And upon authenticating and authorizing the UE for service, the MME and 4G eNB could coordinate setup for the UE of at least one user-plane bearer. In particular, the MME could engage in signaling with the 4G eNB and the SGW 26 to coordinate or trigger setup for the UE of an access bearer, including an S1-U packet tunnel between the 4G eNB and the SGW 26 and an S5 packet tunnel between the SGW 26 and the PGW 28. Further, the 4G eNB could engage in signaling with the UE to establish a data-radio bearer and other configuration parameters cooperatively defining a 4G connection for the UE.

In relation to this attachment process, the 4G eNB could also receive and store capability data for the UE, which could indicate various capabilities of the UE, such as whether or not the UE is EN-DC capable for instance. By way of example, as a last step of the attachment process, the 4G eNB could transmit to the UE an RRC message carrying a UE-capability enquiry, and the UE could respond to the 4G eNB with a "UE capability information" information element (IE), which could indicate UE capabilities including whether the UE is EN-DC capable. Alternatively, the 4G eNB could receive this capabilities data from the HSS 32. The 4G eNB could then store this capability data in a context record for the UE.

Once the UE is so connected with the 4G eNB, the 4G eNB could then proceed to serve the UE in a standalone-4G mode in the manner discussed above.

For instance, when data arrives at the 4G eNB for transmission to the UE, the 4G eNB could allocate one or more downlink PRBs in a subframe for use to transmit at least a portion of the data, defining a transport block, to the UE. The 4G eNB could then transmit to the UE in the control region of that subframe a Downlink Control Information (DCI) message that designates the PRBs, and the 4G eNB could accordingly transmit the transport block to the UE in those designated PRBs.

And when the UE has data to transmit to the 4G eNB (e.g., for transmission on the transport network), the UE could transmit to the 4G eNB a scheduling request that carries with it a buffer status report (BSR) indicating how much data the UE has buffered for transmission. And in response, the 4G eNB could allocate one or more uplink PRBs in an upcoming subframe for carrying a transport block of that data from the UE and could transmit to the UE a DCI message that designates those upcoming PRBs. The UE could then accordingly transmit the transport block to the 4G eNB in the designated PRBs.

If the 4G eNB that the UE connects with through the above process is the EN-DC-capable 4G eNB 14 and if the UE is an EN-DC capable UE 34, then the 4G eNB could additionally work to configure EN-DC service for the UE 34.

For instance, the 4G eNB 14, operating as MeNB, could first engage in process to add the 5G gNB 16 as an SgNB for the UE 34, such as by transmitting to the 5G gNB 16 an SgNB-Addition request to cause the 5G gNB to allocate resources for a 5G connection for the UE 34 on one or more 5G carriers, receiving an SgNB-Addition-Request acknowledge message from the 5G gNB 16, and engaging in associated RRC signaling with the UE 34, in response to which the UE 34 could then access and complete establishment of the 5G connection. Further, in certain implementations, the 4G eNB 14 could engage in signaling with the MME to trigger transfer of the UE's access-bearer to the 5G gNB and could carry out one or more other operations in relation to EN-DC setup for the UE 34.

The 4G eNB 14 and 5G gNB 16 could then provide the UE 34 with EN-DC service, concurrently serving the UE 34 over their respective connections with the UE 34. Namely, the 4G eNB 14 could allocate PRBs of its 4G air interface as needed to carry data over the 4G connection between the 4G eNB 14 and the UE 34, and the 5G gNB could allocate PRBs of its 5G air interface as needed to carry data over the 5G connection between the 5G gNB 16 and the UE 34.

On the other hand, if the 4G eNB that the UE connects with through the above process is the 4G-only eNB 20, then the 4G eNB would not configure EN-DC service for the UE, regardless of whether the UE's capability data indicates that the UE is EN-DC capable. Consequently, if the UE is an EN-DC-capable UE 34, then the UE would not benefit from the EN-DC service that it supports but would rather be restricted to engaging in 4G-only service.

Unfortunately, however, this problem may tend to occur in a geographic area where the 4G-only eNB 20 may provide stronger (e.g., sufficiently stronger) coverage than the EN-DC-capable 4G eNB 14 and where EN-DC-capable UEs tend to operate. Namely, in that geographic area, there might be numerous occurrences of EN-DC-capable UEs finding that coverage from the 4G-only eNB 20 is sufficiently stronger than coverage from the EN-DC-capable 4G eNB 14 and therefore connecting with the 4G-only eNB 20, and thus where those EN-DC-capable UEs do not benefit from the EN-DC service that they support and would also consume resources of the 4G-only eNB 20 that might otherwise be available to serve 4G-only UEs.

As noted above, this problem could be addressed by a system detecting such a scenario and responsively blocking EN-DC-capable UEs from being connected with the 4G-only eNB 20 while allowing 4G-only UEs to be connected with the 4G eNB 20. Such a system could be implemented as or by the 4G-only eNB 20, an element management system (EMS) 38 of the core network, and/or one or more other entities. For instance, any such entity or combination of entities might detect the scenario, and the 4G-only eNB 20 might responsively block EN-DC-capable UEs from being connected with the 4G-only eNB 20 but still allow 4G-only UEs to be connected with the 4G-only eNB 20.

In an example implementation, the system could keep track of instances of EN-DC-capable UEs being connected with the 4G-only eNB 20. For instance, the 4G-only eNB 20 could identify such instances based on the 4G-only eNB 20 being RRC connected with such UEs and learning from capability data or the like that the UEs are EN-DC capable, and the 4G-only eNB 20 could record those instances and/or report the instances to the EMS 38. Alternatively, the 4G-only eNB 20 could report to the EMS each instance of a UE connecting with the 4G-only eNB 20, the EMS could refer to capabilities data to determine each such instance where the UE is EN-DC capable, and the EMS could record the instances.

Further, the system could identify such instances where the EN-DC-capable UEs that are connected with the 4G-only eNB 20 are also located within a geographic area where the UEs may likely also have sufficiently strong coverage from the EN-DC-capable 4G eNB 14 (e.g., strong enough coverage from the EN-DC-capable 4G eNB 14 that they could have connected instead with the EN-DC-capable 4G eNB 14.

The system could identify such instances in various ways. For instance, the system could determine the geographic location of each such UE, perhaps reported by the UEs during or after RRC connection, or through use of any other UE-location-determination process now known or later developed, and the system could compare those UE locations with predefined data defining the geographic bounds of threshold strong coverage of the EN-DC capable 4G eNB 14 to identify instances where the UEs are within those geographic bounds. Alternatively, some or all such UEs might report to the 4G-only eNB 20 that the UEs are also within sufficiently strong coverage of the EN-DC-capable 4G eNB 14. Further, the 4G-only eNB 20 could forward this or other such information to the EMS.

Based on this information, the system could thereby detect a threshold high extent of such occurrences. For example, system could determine that, of all UEs that connect with the 4G-only eNB 20, at least a predefined threshold high percentage of UEs are EN-DC-capable UEs that could instead connect with the EN-DC-capable 4G eNB 14. And as another example, the system could detect at least a predefined threshold high frequency (rate) of such instance per unit time. Further, the system could record the time of day of each such instance and could detect a threshold high extent of such occurrences at that time of day, such as within a given hour of day. And the system could detect these and/or other such high extent of occurrences repeatedly, such as over the course of multiple days or the like.

In response to detecting the threshold high extent of occurrences of EN-DC-capable UEs being connected with the 4G-only eNB 20 when the UEs could instead connect with the EN-DC-capable 4G eNB 14, the system could then block EN-DC-capable UEs from being connected with the 4G-only eNB 20, so as to help increase the likelihood that EN-DC-capable UEs will instead connect with the EN-DC-capable 4G eNB. For instance, the 4G-only eNB 20 could responsively set itself to implement this blocking, and/or the EMS could responsively signal to the 4G-only eNB 20 to cause the 4G-only eNB 20 to implement this blocking.

As noted above, the 4G-only eNB 20 might normally operate in a first mode in which the 4G-only eNB 20 allows UEs to be connected with the 4G-only eNB 20 regardless of whether the UEs are EN-DC-capable. Thus, in the first mode, each time a UE connects or seeks to connect with the 4G-only eNB 20, the 4G-only eNB 20 may allow the UE to be connected with the 4G-only eNB without regard to whether the UE is EN-DC-capable.

In response to the detecting of the threshold high extent of occurrences of EN-DC-capable UEs being connected with the 4G-only eNB 20 when the UEs could instead connect with the EN-DC-capable 4G eNB 14, the 4G-only eNB 20 could then transition from operating in the first mode to instead operating in a second mode. In the second mode, the 4G-only eNB 20 would block UEs that are EN-DC capable from being connected with the 4G-only eNB 20 while still allowing 4G-only UES (i.e., UEs that are not EN-DC-capable) to be connected with the 4G-only eNB 20. Thus, in the second mode, each time a UE connects or seeks to connect with the 4G-only eNB 20, the 4G-only eNB may block the UE from being connected with the 4G-only eNB 20 if the UE is EN-DC capable but would allow the UE to be connected with the 4G-only eNB 20 if the UE is not EN-DC-capable.

The act of the 4G-only eNB 20 blocking EN-DC-capable UEs from being connected with the 4G-only eNB 20 while allowing other UE to be connected with the 4G-only eNB 20 could take various forms.

By way of example, the 4G-only eNB 20 could broadcast a system message that is interpretable by EN-DC-capable UEs to prevent the EN-DC capable UEs from seeking to connect with the 4G-only eNB 20 but that is either not interpretable by other UEs or that is interpretable by other UEs to not be applicable to them.

For instance, the 4G-only eNB 20 could broadcast such a message as part of a System Information Block (SIB) or Master Information Block (MIB) that the 4G-only eNB 20 broadcasts and that UEs would read upon discovering coverage of the 4G-only eNB 20. Thus, if and when an EN-DC-capable UE 34 discovers coverage of the 4G-only eNB 20 and reads that message, the EN-DC-capable UE would interpret the message to mean that the UE should not seek to connect with the 4G eNB, and so the UE would not do so. Whereas, if and when a 4G-only UE 36 discovers coverage of the 4G-only eNB 20 and reads that message, the 4G-only UE may determine that the message is not applicable to the 4G-only UE, and so the 4G-only UE may proceed to connect with the 4G-only eNB 20.

As another example, once a UE connects with the 4G-only eNB 20, the 4G-only eNB 20 could then determine whether the UE is EN-DC capable, such as based on capabilities data as noted above, and could disconnect the UE if the determination is that the UE is EN-DC capable. The 4G-only eNB 20 could do this just after the UE connects, or perhaps for a UE that is already connected with the 4G-only eNB 20 once the blocking starts. And in the latter case, the 4G-only eNB could wait until such a UE completes any active communication session (e.g., a voice call) before releasing the UE's connection.

Namely, if the 4G-only eNB 20 determines that the UE is EN-DC capable, then, based at least in part on that determination, the 4G-only eNB 20 could release the UE's connection and possibly redirect the UE to connect instead with EN-DC-capable eNB 14. For instance, the 4G-only eNB 20 could transmit to the UE an RRC message that indicates release of the UE's RRC connection and perhaps that specifies a carrier and cell identifier of the EN-DC-capable eNB 14 so that the UE can then instead scan for and seek to connect with the EN-DC-capable eNB 14. Further, the 4G-only eNB could accordingly delete its context record for the UE and take other action if appropriate to complete release of the UE's connection with the 4G-only eNB 20. Whereas, if the 4G-only eNB 20 determines that the UE that has connected is not EN-DC-capable, then, based at least in part on that determination, the 4G-only eNB 20 could retain the connection of that UE.

As still another example, once a UE connects with the 4G-only eNB 20, the 4G-only eNB 20 could then determine whether the UE is EN-DC capable, such as based on capabilities data as noted above, and could hand-out the UE to a target eNB such as EN-DC-capable 4G eNB 14 for instance. And as with the disconnecting discussed above, the 4G-only eNB 20 could do this just after the UE connects, or perhaps for a UE that is already connected with the 4G-only eNB 20, and in the latter case could wait until such a UE completes any active communication session (e.g., a voice call) before handing-out the UE.

Namely, if the 4G-only eNB 20 determines that the UE is EN-DC capable, then, based at least in part on that determination, the 4G-only eNB 20 could engage in handover signaling over an inter-access-node interface (e.g., an X2) interface with the EN-DC-capable eNB 14 if possible, to prepare the EN-DC-capable eNB 14 to serve the UE, and could then transmit to the UE a handover directive directing the UE to transition to be served by the EN-DC-capable eNB 14. Whereas, if the 4G-only eNB 20 determines that the UE that has connected is not EN-DC-capable, then, based at least in part on that determination, the 4G-only eNB 20 could retain the connection of that UE.

As yet another example, if a UE is served by another eNB and might hand over to the 4G-only eNB 20, the 4G-only eNB 20 could determine whether the UE is EN-DC capable and could control the handover based on that determination. In practice, the 4G-only eNB 20 might learn whether the UE is EN-DC capable by receiving UE capabilities data from the source eNB that is currently serving the UE. For instance, the source eNB could provide this capabilities data to the 4G-only eNB 20 in an X2-based handover request message or the like.

Thus, if the 4G-only eNB 20 determines that the UE that would hand over to the 4G-only eNB 20 is EN-DC capable, then, based at least in part on that determination, the 4G-only eNB 20 could reject the handover. For instance, the 4G-only eNB 20 could respond negatively to the handover-request message from the source eNB. Whereas, if the 4G-only eNB 20 determines that the UE that would hand over to the 4G-only eNB 20 is not EN-DC capable, then, based at least in part on that determination, the 4G-only eNB 20 may accept the handover. For instance, the 4G-only eNB 20 could respond positively to the handover-request message from the source eNB.

Other examples could be possible as well.

As further noted above, this blocking of EN-DC-capable UEs from being connected with the 4G-only eNB 20 could be done proactively at a given time of day based on a determination that there tends to be a threshold high extent of occurrences of EN-DC-capable UEs connecting with the 4G-only eNB 20 at that time of day. In addition or alternatively, the system could discontinue the blocking, such as by transitioning the 4G-only eNB 20 back from the second mode to the first mode, in response to detecting a sufficiently reduced extent of scenarios where EN-DC-capable UEs seek to connect or connect with the 4G-only eNB 20.

Figure 2:
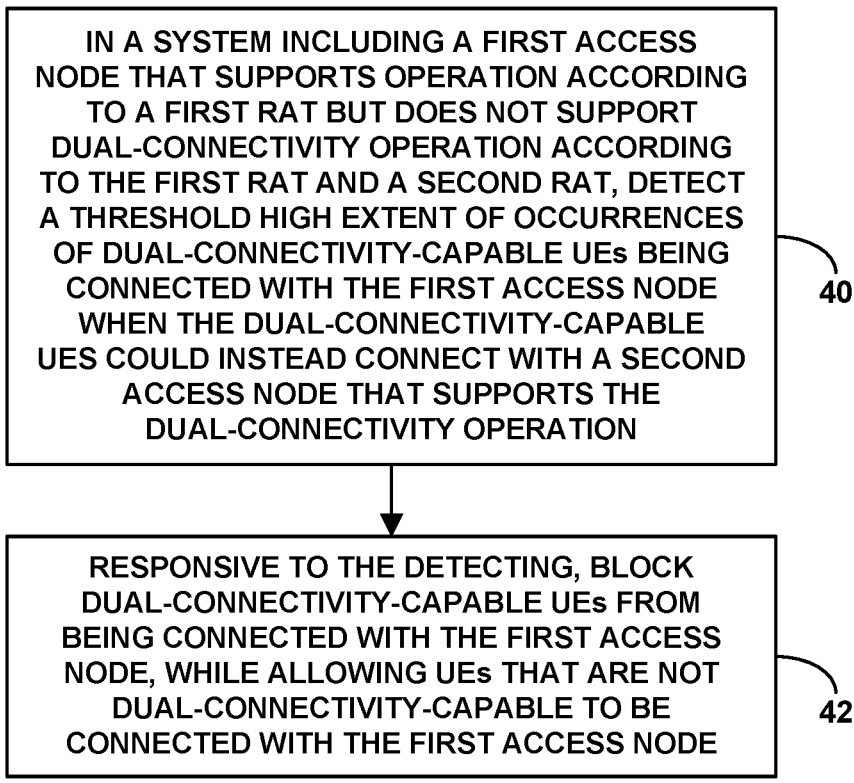
FIG. 2 is a flow chart depicting an example method in accordance with the present disclosure.

FIG. 2 is a flow chart depicting a method that could be carried out in accordance with the present disclosure, to control operation of a first access node, where the first access node supports operation according to a first RAT and does not support dual-connectivity operation according to the first RAT and a second RAT. For instance, the method could function to control operation of a 4G-only eNB, which supports 4G operation but does not support EN-DC operation, such as because the 4G eNB is at a cell site where there is no 5G gNB and/or because the 4G eNB is not configured with logic for working to set up EN-DC service or the like.

As shown in FIG. 2, at block 40, the method includes detecting a threshold high extent of occurrences of dual-connectivity-capable UEs being connected with the first access node when the dual-connectivity-capable UEs could instead connect with a second access node that supports the dual-connectivity operation. And at block 42, the method includes, responsive to the detecting, blocking dual-connectivity-capable UEs from being connected with the first access node, while allowing UEs that are not dual-connectivity-capable to be connected with the first access node.

In line with the discussion above, the act of detecting the threshold high extent of occurrences of dual-connectivity-capable UEs being connected with the first access node when the dual-connectivity-capable UEs could instead connect with the second access node that supports the dual-connectivity operation could involve determining, respectively for each occurrence, that a UE is connected with the first access node, that the UE is dual-connectivity capable, and that the UE is positioned at a location where the UE could instead connect with the second access node that supports the dual-connectivity operation, and determining that the extent of occurrences is threshold high.

Further, the act of detecting the dual-connectivity-capable UEs being connected with the first access node could involve detecting when the dual-connectivity-capable UEs connect with the first access node and/or detecting that the dual-connectivity-capable UEs have connected or are connected with the first access node, among other possibilities.

In addition, as discussed above, the act of determining that each such UE is dual-connectivity capable could be based on capability-data of the UE. And the act of determining that the UE is positioned at the location where the UE could instead connect with the second access node that supports the dual-connectivity operation could be based on location reporting from the UE and/or measurement reporting from the UE (e.g., the UE reporting to the first access node that the UE is within sufficiently strong coverage of the second access node).

Further, the act of determining that the extent of occurrences is threshold high could involve determining that a rate of the occurrences is at least as high as a predefined threshold rate and/or determining that at least a predefined threshold percentage of UEs that connect with the first access node are dual-connectivity capable.

Still further, as discussed above, the act of blocking dual-connectivity-capable UEs from being connected with the first access node while allowing UEs that are not dual-connectivity capable to be connected with the first access node could involve (i) the first access node broadcasting a system message that would cause dual-connectivity-capable UEs to not connect with the first access node but that would not cause UEs that are not dual-connectivity capable to not connect with the first access node, (ii) the first access node releasing from the first access node a connection with a first UE based at least on the first UE being dual-connectivity capable but retaining a connection with a second UE based at least on the second UE not being dual-connectivity capable, (iii) the first access node handing-out a first UE based at least on the first UE being dual-connectivity capable but retaining service of a second UE based at least on the second UE not being dual-connectivity capable, and (iv) the first access node rejecting hand-in of a first UE based at least on the first UE being dual-connectivity capable but accepting hand-in of a second UE based at least on the second UE not being dual-connectivity capable, among other possibilities.

Note that the blocking is thus not blocking generally but is rather blocking that is specifically keyed to UEs that are dual-connectivity capable. Further, instances of the blocking could involve a situation where a dual-connectivity-capable UE is or gets connected with the first access node and then, to be blocked, gets released, handed-out, or the like, from the first access node.

In addition, as discussed above, the method could additionally involve predicting a time of day when the detected threshold high extent of occurrences of will occur, such as when the threshold high extent is likely to recur, in which case the act of blocking dual-connectivity-capable UEs from being connected with the first access node while allowing UEs that are not dual-connectivity-capable to be connected with the first access node could involve, based on the predicting, doing so at or approaching the predicted time of day.

Figure 3:
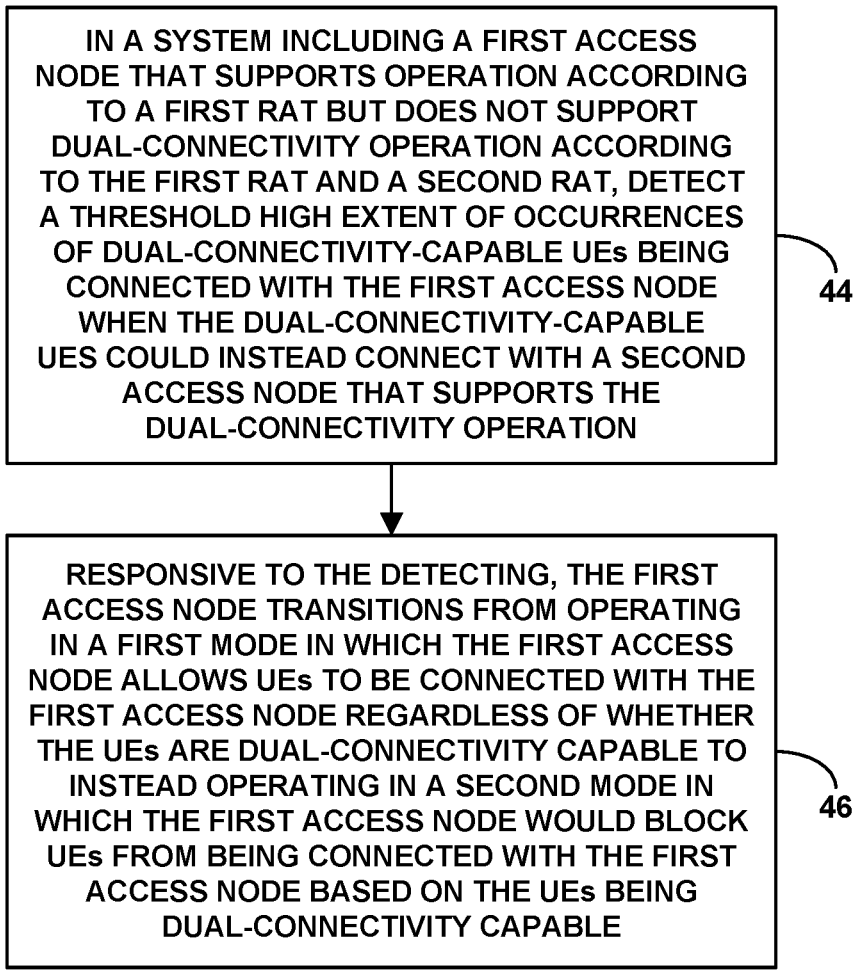
FIG. 3 is another flow chart depicting an example method in accordance with the disclosure.

FIG. 3 is another flow chart depicting a method that could be carried out in accordance with the present disclosure, to control operation of a first access node, where the first access node supports operation according to a first RAT and does not support dual-connectivity operation according to the first RAT and a second RAT. Here too, the method could function to control operation of a 4G-only eNB, which supports 4G operation but does not support EN-DC operation, such as because the 4G eNB is at a cell site where there is no 5G gNB and/or because the 4G eNB is not configured with logic for working to set up EN-DC service or the like.

As shown in FIG. 3, at block 44, the method includes detecting a threshold high extent of occurrences of dual-connectivity-capable UEs being connected with the first access node when the dual-connectivity-capable UEs could instead connect with a second access node that supports the dual-connectivity operation. And at block 46, the method includes, responsive to the detecting, the first access node transitioning from operating in a first mode in which the first access node allows UEs to be connected with the first access node regardless of whether the UEs are dual-connectivity-capable to instead operating in a second mode in which the first access node would block UEs from being connected with the first access node based on the UEs being dual-connectivity capable.

Figure 4:
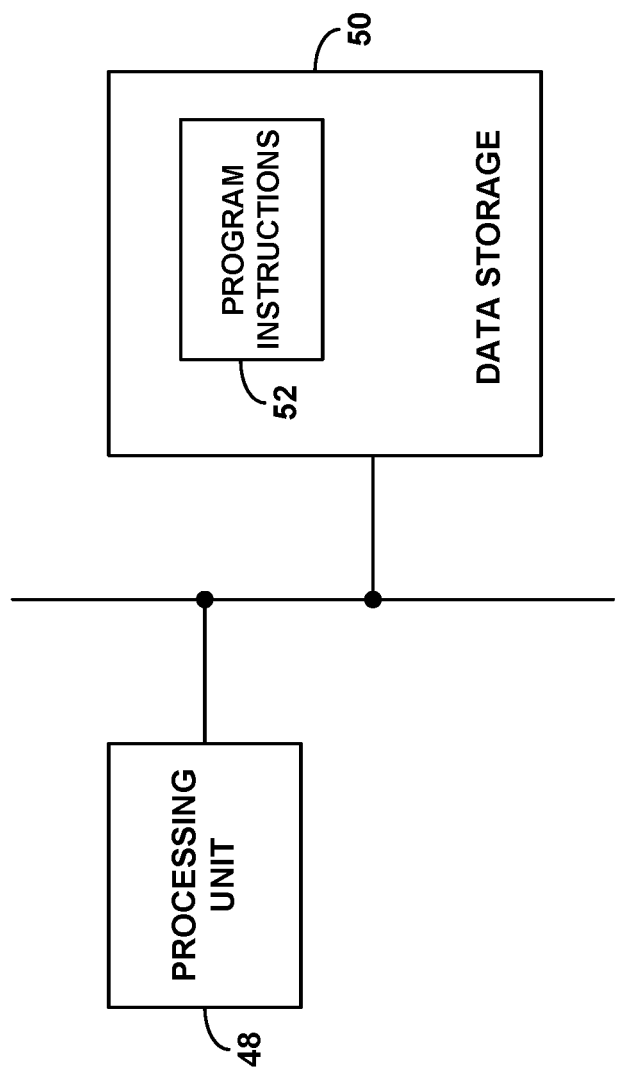
FIG. 4 is a simplified block diagram of an example system operable in accordance with the disclosure.

FIG. 4 is next a simplified block diagram of an example system configured to control operation of a first access node, where the first access node supports operation according to a first RAT (e.g., 4G LTE) and does not support dual-connectivity operation (e.g., EN-DC) according to the first RAT and a second RAT (e.g., 5G NR).

As shown in FIG. 4, the example system comprises at least one processing unit 48 (e.g., one or more general purpose microprocessors and/or one or more dedicated processors), at least one non-transitory data storage 50 (e.g., one or more volatile and/or non-volatile storage components, such as magnetic, optical or flash storage), and program instructions 52, which could be stored in the non-transitory data storage 50 and executable by the processing unit 48 to carry out various operations described herein. For instance, the operations could include (i) detecting a threshold high extent of occurrences of dual-connectivity-capable UEs being connected with the first access node when the dual-connectivity-capable UEs could instead connect with a second access node that supports the dual-connectivity operation and (ii) responsive to the detecting, blocking dual-connectivity-capable UEs from being connected with the first access node, while allowing UEs that are not dual-connectivity-capable to be connected with the first access node.

As discussed above, this system could be implemented at the first access node, such as by components of the first access node. Alternatively or additionally, the system could be implemented at an EMS or other entity, in which case, blocking dual-connectivity-capable UEs from being connected with the first access node while allowing UEs that are not dual-connectivity-capable to be connected with the first access node could involve transmitting to the first access node a directive that causes the first access node to operate accordingly, i.e., to which the first access node is configured to respond by operating accordingly.

Various features discussed above can be implemented in this context as well, and vice versa.

For example, the act of detecting the threshold high extent of occurrences of dual-connectivity-capable UEs being connected with the first access node when the dual-connectivity-capable UEs could instead connect with the second access node that supports the dual-connectivity operation could involve (i) determining, respectively for each occurrence, that a UE is connected with the first access node, that the UE is dual-connectivity capable, and that the UE is positioned at a location where the UE could instead connect with the second access node that supports the dual-connectivity operation and (ii) determining that the extent of occurrences is threshold high, such as that a rate of the occurrences is at least as high as a predefined threshold rate.

Further, in terms of blocking dual-connectivity-capable UEs from being connected with the first access node while allowing UEs that are not dual-connectivity capable to be connected with the first access node, (i) the first access node be configured to broadcast a system message that would cause dual-connectivity-capable UEs to not connect with the first access node but that would not cause UEs that are not dual-connectivity capable to not connect with the first access node, (ii) the first access node could be configured to release from the first access node a connection with a first UE based at least on the first UE being dual-connectivity capable but to retain a connection with a second UE based at least on the second UE not being dual-connectivity capable, (iii) the first access node could be configured to hand-out a first UE based at least on the first UE being dual-connectivity capable but to retain service of a second UE based at least on the second UE not being dual-connectivity capable, and/or (iv) the first access node could be configured to reject hand-in of a first UE based at least on the first UE being dual-connectivity capable but to accept hand-in of a second UE based at least on the second UE not being dual-connectivity capable, among other possibilities.

Figure 5:
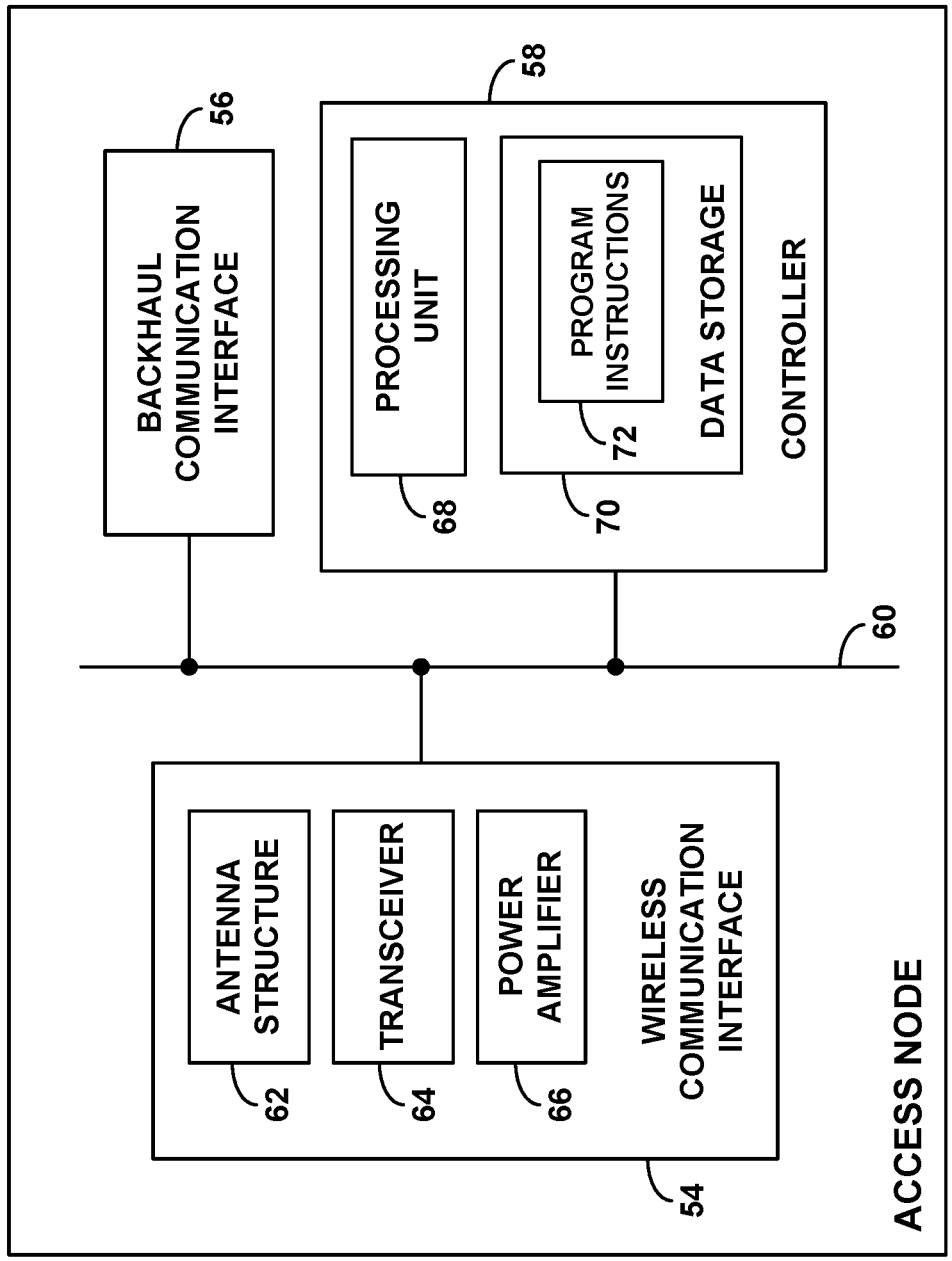
FIG. 5 is a simplified block diagram of an example access node operable in accordance with the disclosure.

Finally, FIG. 5 is a simplified block diagram of an example first access node that may support operation according to a first RAT but not support dual-connectivity operation according to the first RAT and a second RAT.

As shown in FIG. 5, the example first access node includes a wireless communication interface 54, a backhaul communication interface 56, and a controller 58, which could be integrated or communicatively linked together by a system bus, network, or other connection mechanism 60 and/or could be integrated together or distributed in various ways.

The wireless communication interface 54 could include an antenna structure (e.g., a MIMO antenna array, possibly a massive-MIMO array) 62, a transceiver 64, and a power amplifier 66, among one or more other RF components, to cooperatively facilitate engaging in air interface communication with UEs according to the first RAT. And the backhaul communication interface 52 could include a wireless and/or wireless network communication module configured to support communication with other entities as discussed above.

The controller 58 could then include a processing unit 68 including one or more processors (e.g., general purpose microprocessors and/or dedicated processing units), non-transitory data storage 70 (e.g., one or more volatile and/or non-volatile storage components, such as magnetic, optical or flash storage), and program instructions 72, which could be stored in the non-transitory data storage 70 and executable by the processing unit 68 to cause the first access node to carry out various operations described herein. For instance, the operations could include (i) detecting a threshold high extent of occurrences of dual-connectivity-capable UEs being connected with the first access node when the dual-connectivity-capable UEs could instead connect with a second access node that supports the dual-connectivity operation and (ii) responsive to the detecting, blocking dual-connectivity-capable UEs from being connected with the first access node while allowing UEs that are not dual-connectivity capable to be connected with the first access node.

Various feature described above can be implemented in this context as well, and vice versa.

Further, the present disclosure contemplates a computer-readable medium encoded with, storing, or otherwise embodying program instructions executable by at least one processing unit to carry out various operations described herein.

Exemplary embodiments have been described above. Those skilled in the art will understand, however, that changes and modifications may be made to these embodiments without departing from the true scope and spirit of the invention.

We claim:

1. A method for controlling operation of a first access node, wherein the first access node supports operation according to a first radio access technology (RAT) and does not support dual-connectivity operation according to the first RAT and a second RAT, the method comprising:

detecting a threshold high extent of occurrences of dual-connectivity-capable user equipment devices (UEs) being connected with the first access node when the dual-connectivity-capable UEs could instead connect with a second access node that supports the dual-connectivity operation; and responsive to the detecting, blocking dual-connectivity-capable UEs from being connected with the first access node, while allowing UEs that are not dual-connectivity-capable to be connected with the first access node.

2. The method of claim 1, wherein detecting the threshold high extent of occurrences of dual-connectivity-capable UEs being connected with the first access node when the dual-connectivity-capable UEs could instead connect with the second access node that supports the dual-connectivity operation comprises:
   determining, respectively for each occurrence, that a UE is connected with the first access node, that the UE is dual-connectivity capable, and that the UE is positioned at a location where the UE could instead connect with the second access node that supports the dual-connectivity operation; and
   determining that the extent of occurrences is threshold high.

3. The method of claim 2, wherein determining that the UE is dual-connectivity capable is based on capability-data of the UE.

4. The method of claim 2, wherein determining that the UE is positioned at the location where the UE could instead connect with the second access node that supports the dual-connectivity operation is based on location reporting from the UE.

5. The method of claim 2, wherein determining that the UE is positioned at the location where the UE could instead connect with the second access node that supports the dual-connectivity operation is based on measurement reporting from the UE.

6. The method of claim 2, wherein determining that the extent of occurrences is threshold high comprises determining that a rate of the occurrences is at least as high as a predefined threshold rate.

7. The method of claim 2, wherein determining that the extent of occurrences is predefined threshold high comprises determining that at least a predefined threshold percentage of UEs that connect with the first access node are dual-connectivity capable.

8. The method of claim 1, further comprising predicting a time of day when the detected threshold high extent of occurrences of will recur, wherein, based on the predicting, the blocking dual-connectivity-capable UEs from being connected with the first access node while allowing UEs that are not dual-connectivity capable to be connected with the first access node is carried out at or approaching the predicted time of day.

9. The method of claim 1, wherein the first RAT is 4G LTE, the second RAT is 5G NR, and the dual-connectivity is EUTRA-NR Dual Connectivity (EN-DC).

10. A method for controlling operation of a first access node, wherein the first access node supports operation according to a first radio access technology (RAT) and does not support dual-connectivity operation according to the first RAT and a second RAT, the method comprising:
   detecting a threshold high extent of occurrences of dual-connectivity-capable user equipment devices (UEs) being connected with the first access node when the dual-connectivity-capable UEs could instead connect with a second access node that supports the dual-connectivity operation; and
   responsive to the detecting, transitioning by the first access node from operating in a first mode in which the first access node allows UEs to be connected with the first access node regardless of whether the UEs are dual-connectivity-capable to instead operating in a second mode in which the first access node would block UEs from being connected with the first access node based on the UEs being dual-connectivity capable.

11. The method of claim 10, wherein detecting the threshold high extent of occurrences of dual-connectivity-capable UEs being connected with the first access node when the dual-connectivity-capable UEs could instead connect with the second access node that supports the dual-connectivity operation comprises:
   determining, respectively for each occurrence, that a UE is connected with the first access node, that the UE is dual-connectivity capable, and that the UE is positioned at a location where the UE could instead connect with the second access node that supports the dual-connectivity operation; and
   determining that the extent of occurrences is threshold high.

12. The method of claim 11, wherein determining that the UE is positioned at the location where the UE could instead connect with the second access node that supports the dual-connectivity operation is based on location reporting from the UE.

13. The method of claim 11, wherein determining that the UE is positioned at the location where the UE could instead connect with the second access node that supports the dual-connectivity operation is based on measurement reporting from the UE.

14. The method of claim 10, wherein the first RAT is 4G LTE, the second RAT is 5G NR, and the dual-connectivity is EUTRA-NR Dual Connectivity (EN-DC).

15. A system for controlling operation of a first access node, wherein the first access node supports operation according to a first radio access technology (RAT) and does not support dual-connectivity operation according to the first RAT and a second RAT, the system comprising:
   a processing unit;
   non-transitory data storage; and
   program instructions stored in the non-transitory data storage and executable by the processing unit to (i) detect a threshold high extent of occurrences of dual-connectivity-capable user equipment devices (UEs) being connected with the first access node when the dual-connectivity-capable UEs could instead connect with a second access node that supports the dual-connectivity operation and (ii) responsive to the detecting, blocking dual-connectivity-capable UEs from being connected with the first access node, while allowing UEs that are not dual-connectivity-capable to be connected with the first access node.

16. The system of claim 15, wherein the system is implemented at least in part at the first access node.

17. The system of claim 15, wherein the system is implemented at least in part at an element management system, and wherein blocking dual-connectivity-capable UEs from being connected with the first access node while allowing UEs that are not dual-connectivity-capable to be connected with the first access node could involve transmitting to the first access node a directive that causes the first access node to block dual-connectivity-capable UEs from being connected with the first access node while allowing UEs that are not dual-connectivity-capable to be connected with the first access node.

18. The system method of claim 15, wherein detecting the threshold high extent of occurrences of dual-connectivity-capable UEs being connected with the first access node when the dual-connectivity-capable UEs could instead connect with the second access node that supports the dual-connectivity operation comprises:
  determining, respectively for each occurrence, that a UE is connected with the first access node, that the UE is dual-connectivity capable, and that the UE is positioned at a location where the UE could instead connect with the second access node that supports the dual-connectivity operation; and
  determining that the extent of occurrences is threshold high.

19. The system of claim 18, wherein determining that the extent of occurrences is threshold high comprises determining that a rate of the occurrences is at least as high as a predefined threshold rate.

20. The system of claim 15, wherein the first RAT is 4G LTE, the second RAT is 5G NR, and the dual-connectivity is EUTRA-NR Dual Connectivity (EN-DC).

* * * * *